FIG.4

March 24, 1931.  T. U. WHITE  1,798,128
POWER DISPATCHING SYSTEM
Filed March 16, 1928    5 Sheets-Sheet 5

Inventor
Thomas U. White
By Zabel & Banning Attys.

Patented Mar. 24, 1931

1,798,128

UNITED STATES PATENT OFFICE

THOMAS U. WHITE, OF GENOA, ILLINOIS, ASSIGNOR TO LEICH ELECTRIC COMPANY, OF GENOA, ILLINOIS, A CORPORATION OF ILLINOIS

POWER-DISPATCHING SYSTEM

Application filed March 16, 1928. Serial No. 262,069.

My invention relates to remote selective control of devices used to indicate the position of electrical apparatus such as switches or relays or other power equipment. More specifically it pertains to remote selective control of such indicating devices as are used on centralized power load dispatching boards.

In the huge power systems of today where a large number of power switching operations are controlled either by telephonic orders or remote selective control methods from a central dispatching office, it is imperative that the load dispatcher have a visual picture before him of the condition of the various control elements in the power network and a true indication of the physical layout of such control devices and their function and condition in the entire circuit.

The modern power load dispatcher's office is provided with a complete map of the power network comprising the many switching and control elements under his direct or indirect supervision. This map is usually of the wall type and is laid out to scale with reference to the physical or geographical location of the various power houses, generating stations, switching stations and power distributing stations which togther make up the power system. What is known as the straight line or one line circuit diagram is usually used to connect the various switching elements and to show the position of the power transmission and distributing lines with reference to the various stations and to the cities or towns which are supplied with electrical energy.

In many instances there are from 1,000 to 3,000 or more switching operations under the direct control of a central load dispatcher's office. A chief load dispatcher and several assistants in the office control the entire generation and distribution of power for many miles around by means of telephonic orders to station attendants or by some remote selective control method from a central dispatching office. Various devices have been employed for indicating the position of the oil switches or circuit breaker or disconnects and air break switches in the straight line diagram or map of the power system. Generally these have been manually controlled devices which in most cases require the dispatcher to go to the wall map and manually change a colored lamp signal or a colored plug or close a switch in order to show a change in the position of the power switching device. Recently there have been some key controlled maps installed. By the use of keys located on the dispatcher's desk in these systems, the various indications on the wall map are set to show the changed position of a switching device upon receipt of information that a dispatching order telephoned out to the station attendant has been carried out.

Where a large number of these switching operations are handled by the dispatcher, this key controlled method is not always satisfactory as the keys and their required designating devices associated therewith take up such a large amount of room at the desk of the dispatcher that their use is not practical. When several load dispatchers are handling switching operations, the keys must be multipled from one desk to another or the load dispatching work undesirably split up between the several operations.

It is the main object of this invention to provide satisfactory means for selectively controlling the indicating devices on the load dispatcher's map and to provide a highly improved scheme to assist the load dispatcher in accurately handling the switching operations from a centralized dispatching point.

It is a further object of this invention to provide a selective signalling system by means of which signalling devices may be set up at will to provide a living diagram of a power system at all times.

It is also an object of this invention to provide a system of this character which will reduce the amount of apparatus required at the dispatcher's desk to such an extent as to make it simple and effective while still permitting him to change any desired signal on the main dispatching map.

It is a further object of this invention to provide a selective means enabling the several dispatchers to operate signals on one main dispatching map by means of the small amount of equipment at each dispatcher's position.

Another object of this invention is to provide means for enabling the dispatcher to obtain a check-back indication which efficiently identifies the selection made by means of the remote selective control apparatus prior to the operation of the signals.

A further object of this invention is to provide a selective signal control system which requires a dispatcher or operator to perform the operation of the signal devices locally in the same manner that the actual power switching devices are controlled by a station attendant who may be many miles away as a check on the accuracy of the switching information transmitted by other means, usually by telephone, to the attendant at the distant power station.

Another object of this invention is to enable the power load dispatcher to set up on the dispatching board a contemplated switching operation involving several units in order that a check may be obtained on the accuracy and the probable effect of the proposed changes and to maintain this checking condition so long as desired prior to the actual operation of the signals on the dispatching map.

Still another object of this invention is to provide a visual indication before the dispatcher of all outstanding incompleted dispatching orders.

It is also an object of this invention to provide signalling devices, the position of which when established is maintained independently of the electrical circuits or power establishing the position.

A further object is to provide in a power dispatching system means for selectively controlling the indicating devices on the power dispatching map in conjunction with selectively controlling telephonic communication facilities over which dispatching orders are to be transmitted.

Another object of this invention is to provide a selective means of control for signal devices on a power dispatching map in conjunction with the selective operation of power transmission testing apparatus such, for instance, as what is generally termed a short circuit board located in central stations for determining the probable location of a short circuit in the line.

Another important object of my invention is to provide in a dispatcher's indicating system including a system map having thereon a plurality of individual signalling devices, or lamp units adapted to display two unlike signals in addition to a no signal indication, means under the control of the dispatcher to select a plurality of the signalling devices and cause them to display one of the unlike signals and thereafter permit the dispatcher to change to the other unlike signal.

Other objects and advantages of the invention will appear as the description proceeds in connection with the accompanying drawings wherein one form which the invention may take is illustrated more or less diagrammatically. However, it is obvious that various modifications in the details of the system may be made without departing from the scope of the invention.

In the drawings which comprise Figs. 1 to 6, inclusive, sufficient circuits and apparatus have been shown by means of conventional diagrams to enable my invention to be readily explained and understood.

Figure 1:
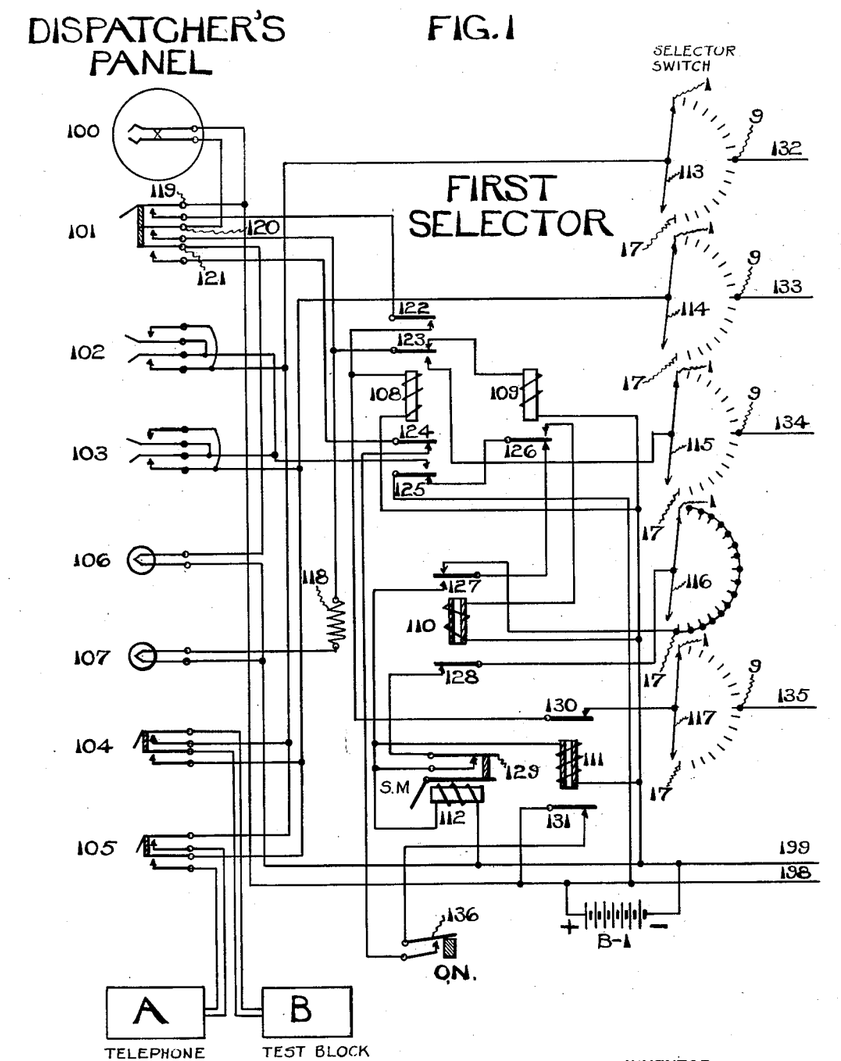
Figs. 1 to 3 inclusive illustrate the selecting devices and the signal devices to be controlled thereby. These figures occupying as they do one sheet each should be placed side by side in order to show the completed system.

In Fig. 1 a dial device 100, the keys 101 to 105 inclusive and the lamp signals 106 and 107 are located at the dispatcher's desk or controlling and supervising panel. All other apparatus shown in Figs. 1 to 3 inclusive is located at the wall map or dispatching diagram.

In carrying out my invention, I employ selecting apparatus of the type used extensively in the automatic telephone art, modified to meet my requirements. At the dispatcher's desk the only equipment required is a dial device similar to that used in automatic telephones, selecting, connecting and controlling keys and two lamp signals. Several dispatchers may be provided with this same type of equipment for controlling signal devices on a control map.

The general operation of my system is as follows:

A dispatcher operates a selective key to connect in the dial switch and then dials the number of the power switching element as it is assigned on a straight line diagram or map. Through the medium of a first and second selector and connector switch similar to the type used in automatic telephony, a pair of conductors are connected from the close and trip control keys located on the dispatcher panel to a latching relay or electrically restored drop device, which in turn controls the signal devices in the straight line diagram of the wall map.

When the selecting operation is completed, the particular signal selected is automatically caused to flash or operate intermittently in order to enable the dispatcher to check the accuracy of his selecting devices. This makes the system safe and proof against false operation as the dispatcher obtains by means of the flashing or intermittently operating signal devices, a check back on the operation of the equipment controlled by the dial selecting device. After the selection, the dispatcher may close or trip the latching relay to operate the drop device to either of two positions, thus illuminating a red or green lamp signal as desired.

The dispatcher thus actually performs the operation at the office in the same manner as it may be performed by an attendant at a distant station or by remote control devices at the remote station probably many miles away. The latching relays or electrically restored drops prevent false indications in the case of a failure of current supply to the lamp signal controlling devices.

Except for the small current consumed by the selecting device during the selecting operations and shifting of signals on the map, the only current consumed is taken by the lamp signals on the wall map. When the dispatchers' apparatus is multiplied to a number of dispatchers' desks, a busy lamp signal is provided at each desk to signal the dispatcher when a final connecter or selector is in a busy condition.

One of the outstanding features of this selectively controlled map system is the circuit arrangement by which the dispatcher's orders may be set up on the board in flashing signals, then changed to steady signals when the order has been reported back as carried out. Thus, before the dispatcher issues orders for switching operations the proposed moves may be set up on the straight-line diagram by means of flashing signals, which remain flashing as an indication of an outstanding or uncompleted switching order. He may check over his plans and change the signals as desired, to steady, closed or tripped indications, at any time before or after the switching orders have been carried out.

Referring now more particularly to Fig. 1, the keys 101, 104 and 105 of the ordinary single-throw, locking type, the keys 102 and 103 of the push, non-lock type, relays 108 to 111, inclusive, stepping magnet 112, switch wipers 113 to 117, inclusive, and their associated switch banks and off-normal springs comprise the first selector device.

The dial selective device 100 and the noninductive resistance 118 are a part of the dispatcher's selective equipment. The battery B 1 is a common current supply of twelve, twenty-four or forty-eight volts direct current.

Figure 2:
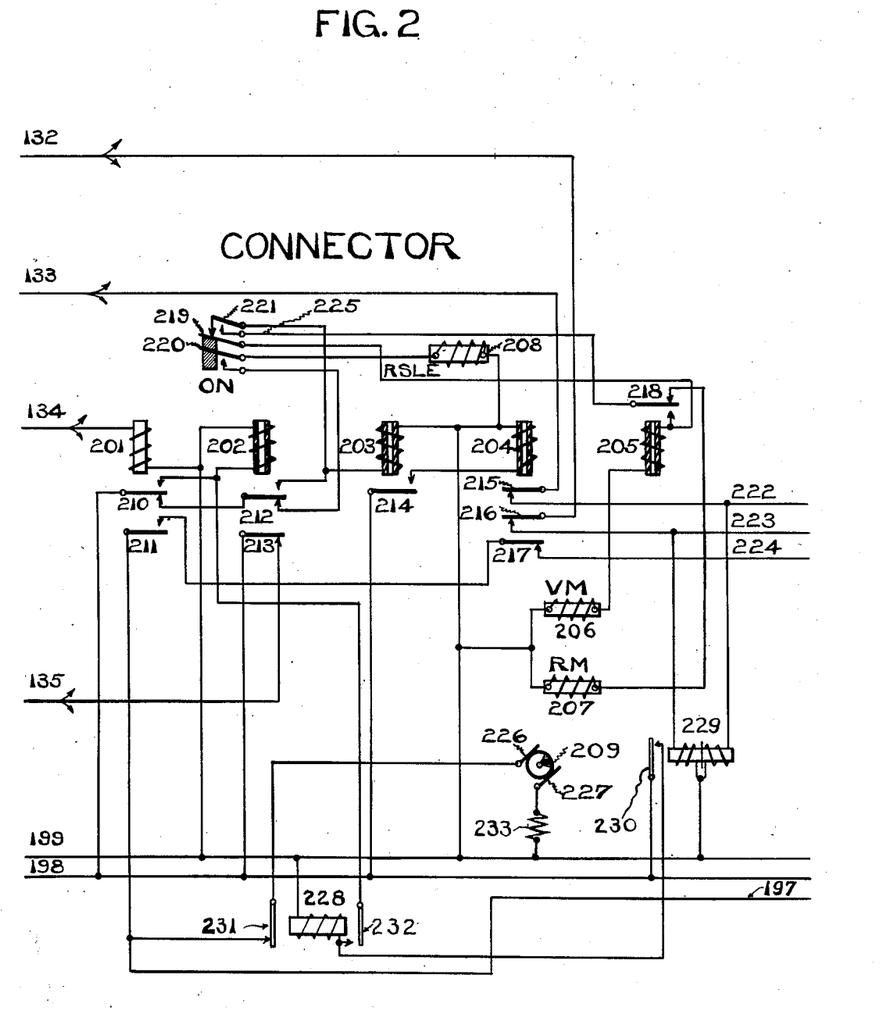
Figure 3:
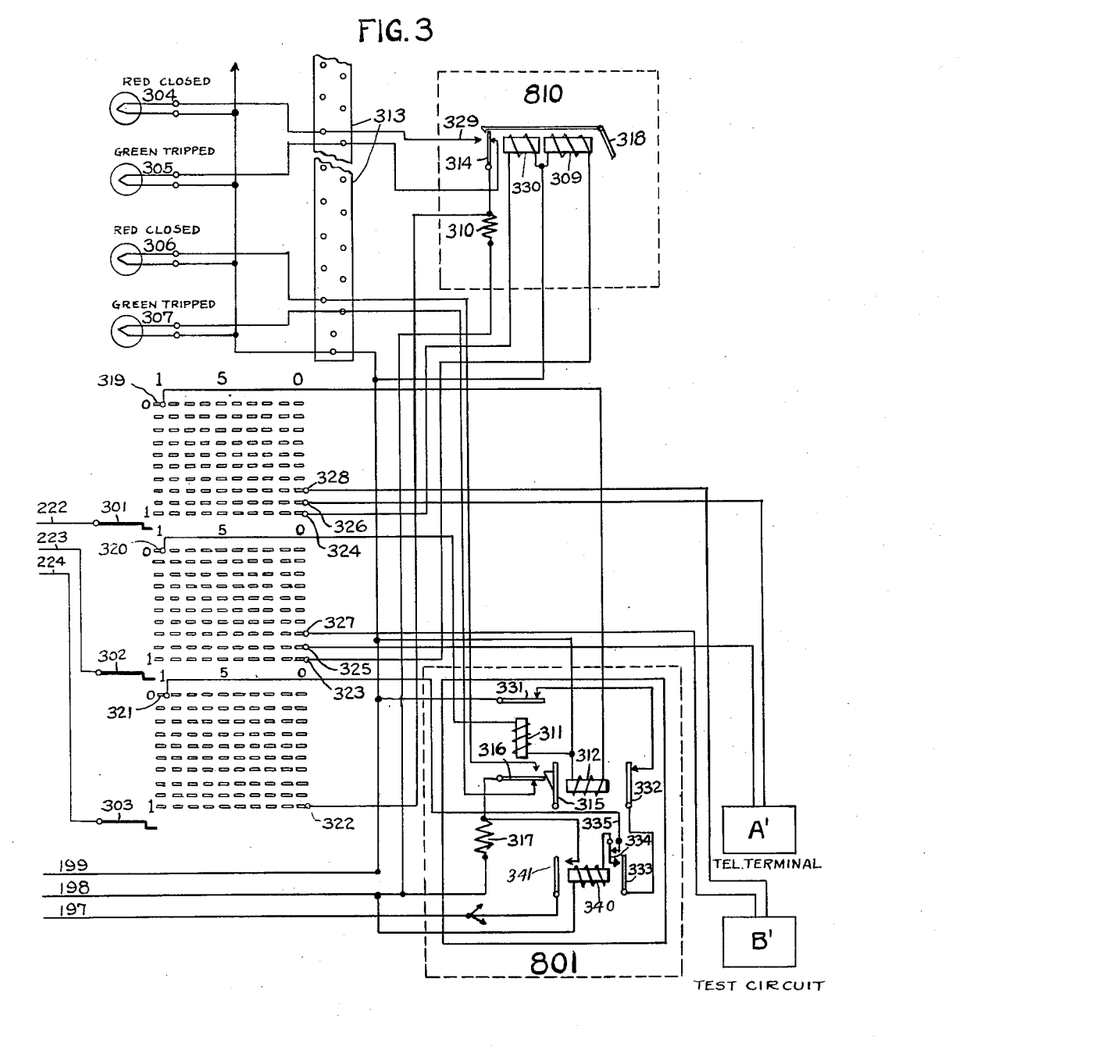

In Figs. 2 and 3, the relays 228 and 229 and relays 201 to 205, inclusive, the magnets 206 to 208, inclusive, the interrupter 209, off-normal springs O. N., the wipers 301 to 303, inclusive, and their associated bank contacts comprise the connector circuit.

The lamp signals 304 and 305, forming one unit, and 306 and 307, forming another unit, are signal devices located on the wall map. The signal switching device 810 and resistance 310 are associated with lamp signals 304 and 305. The device designated 801 comprises a latching-relay type, signal switching device which is associated with lamp signals 306 and 307. Only the terminal board 313 is shown of the actual wall map construction.

Figure 4:
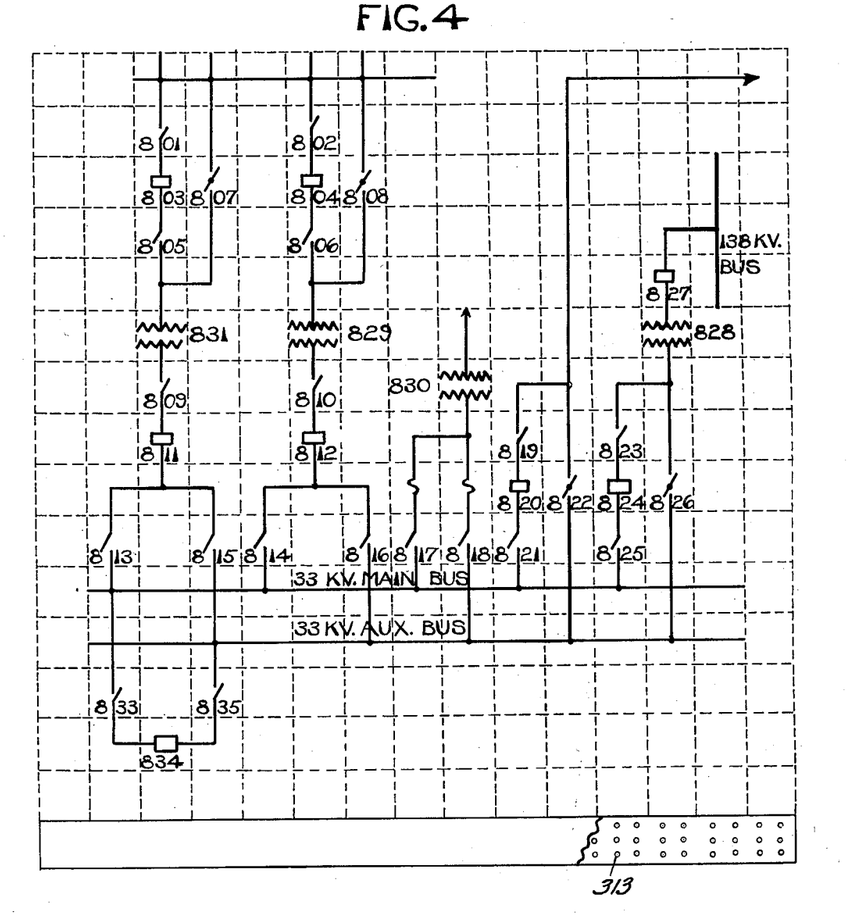
Fig. 4 illustrates schematically a portion of the straight line diagram power system made up of an assembly of blank escutcheons and equipped lamp signal units.

Fig. 4 illustrates a typical schematic layout of a portion of a power switching system using the straight-line "living diagram" method. A portion of the face equipment of a dispatching board is here shown. The entire face equipment consists of an assembly of blank escutcheons and equipped lamp signal devices 10. The lamp signal devices are given a number on the face equipment. All escutcheons have a slight grooving as at 14 which is filled in with colored paints to make up the one line diagram.

Figure 5:
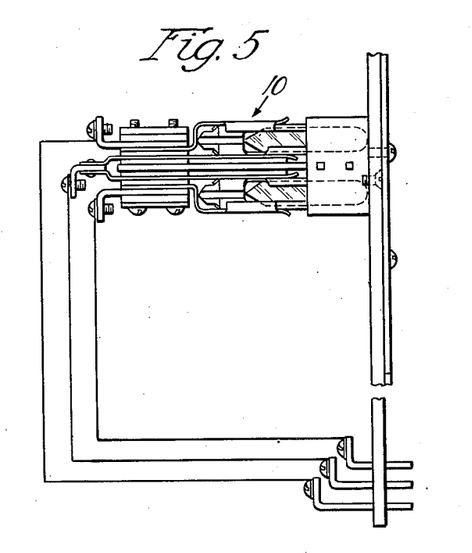
Figs. 5 and 6 show one type of signal unit which may be used in carrying out my invention.
Figure 6:
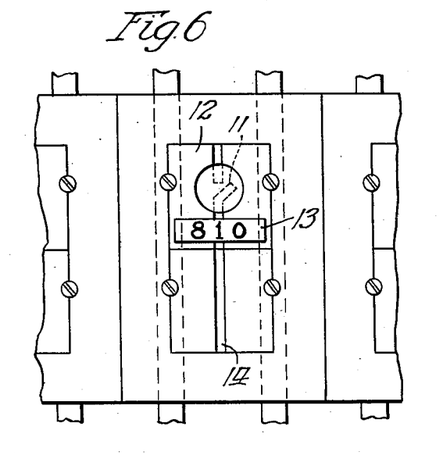

Figs. 5 and 6 show a lamp-signal unit 10 with one red and one green frosted bulb arranged to be mounted behind a single lens 11 in such manner that when the filament of one bulb is energized its color will show through the single lens located in the face plate 12. The circuit designation of apparatus symbol is placed on the lens in this face plate and the number of the switch is placed under the lens opening at 13.

From the above description it will be seen that the lamp-signal units may be interchanged with the blank escutcheons to make the face equipment easily adaptable to changes in the equipment of the power system.

The lamp-signal units are connected to a terminal strip 313 at the bottom of the map by means of flame-proof, cross-connecting wire which is generally designated as "jumper" wire. The jumper wires are arranged in the rear of the map in such manner that they may be changed about readily whenever it is desired to do so.

The relay and switch mechanism, as shown in Figs. 1 to 3, inclusive, is mounted on suitable supports in the rear of the map, or, if necessary, may be mounted in a separate relay cabinet and connected by cables to the terminal strip at the bottom of the map.

It is thought that the above general description is sufficient to give a general idea of the construction and operation of the apparatus, and the detailed operation will now be explained in connection with the drawings.

The green lamp signal 305 is shown lighted on the drawings. The filament of this lamp is energized over a path which extends from positive battery and conductor 198 through winding of resistance 310, armature 314 and its resting bank contact and filament of lamp signal 305 to negative battery on the conductor 199. By reason of this condition the lamp-signal unit 810 on the straight-line map, shown in Fig. 4, illuminates the symbol on its lens with a green colored light that indicates that the actual power switching element represented by this signal unit is in its open or tripped position and that there is no current flowing in the straight line between the transformer 829 and the circuit breaker 812.

Assuming that the dispatcher desires to close the actual power-switching device 810, which may be many miles away, he first selects the signal device 810 on the straight-line diagram wall-map in order to study the probable result of closing this switching device. He has information at hand of the load requirements of his system, which is generally obtained from meter readings and his knowledge of the customers' requirements.

The switch 810 may be only one of several switches that he proposes to operate at this time. However, we will describe the operation of this invention in connection with the selection and control of the lamp-signal devices 810 and 801.

The dispatcher operates the key 101 located on his control panel in such manner as to cause the lever springs 119 to 121, inclusive, to make contact with the working springs. As a result of this action, there is a circuit completed which extends from positive battery through making contacts of dial device 100, lever spring 120 and its making contact, winding of resistance 118 and filament of lamp signal 107 to negative battery. The lamp signal 107 when energized over this circuit indicates to the dispatcher that the switch type selecting apparatus is connected to the dial control device.

As another result of the operation of the key 101 as described, there is a circuit completed which extends from positive battery through making contacts of dial device 100, lever spring 120 and its making contact, armature 123 and its back contact, and winding of relay 109 to negative battery. Relay 109 is energized over this path.

As a result of the energization of relay 109 there is a circuit completed which extends from positive battery through armature 125 and its back contact, armature 126 and its front contact, and winding of relay 110 to negative battery. The relay 110 is of the slow to release type and is energized over the path just traced. The relay 109 is an impulsing relay and is arranged to be operated, that is, energized and de-energized in turn, under control of the dial device 100. Each time the normally-closed contacts of the dial device 100 are opened the relay 109 is de-energized, and the relay is again energized upon restoring the contacts of the dial device to closed position.

The relay 110, being a slow to release type, is arranged to maintain its armatures 127 and 128 in their energized position during the rapid operation of the relay 109 as above described. With relay 110 energized, the stepping magnet 112 is connected to the circuits of armature 126 on relay 109 in such manner that each time relay 109 is de-energized the stepping magnet 112 is energized.

This energizing circuit for the stepping magnet 112 may be traced over a path which extends from positive battery at armature 125 and its back contact, through armature 126 and its back contact, armature 127 and its front contact and the winding of stepping magnet 112 to negative battery.

Each time the stepping magnet 112 is energized in this manner a pawl and ratchet device directly connected to the armature of the stepping magnet is operated in such manner as to prepare the wiper shaft and wipers 113 to 117, inclusive, for movement one step in a step-by-step rotation. This movement occurs when the stepping magnet 112 is again de-energized. A spring on the pawl and ratchet mechanism of the stepping magnet 112 causes the actual movement of the wiper shaft to which the wipers 113 to 117, inclusive, are attached. The normal resting point of the wipers 113 to 117, inclusive, is on contact No. 1 of their respective switch banks.

The slow to release type relay 111 is energized in parallel with the stepping magnet 112. This relay maintains its armatures 130 and 131 attracted during the rapid operation of the stepping magnet 112. In this manner the circuits of the testing wiper 117 and the circuits of the off-normal contacts O. N. are maintained open during the operation of the stepping magnet 112.

To select the signal unit 810, the dispatcher first dials the digit 8. As a result, the dial device 100 interrupts the energizing circuit of relay 109 eight times, and the stepping magnet 112 is energized and de-energized eight times. The relays 109 and 110 remain energized at the end of the train of impulses. The energizing circuit of stepping magnet 112 and relay 111 is opened at the end of the train of impulses.

As a result of the operation of the stepping magnet 112, the wipers 113 to 117 associated with the common rotating shaft are moved from their normal resting position on contact 1 of their respective switch banks to contact 9 on said switch banks.

Relay 111 retracts its armatures after a slight interval of time, and as a result a circuit is now completed which extends from positive battery on conductor 198 through armature 213 and its back contact, resting contact 9 and wiper 117, back contact and armature 130, and winding of relay 108 to negative battery. Relay 108 is energized over this path.

As a result of this energization, at armature 122, a holding circuit is completed for relay 108. This circuit may be traced from positive battery through lever 119 of key 101 and its working contact, armature 122 and its front contact, and winding of relay 108 to negative battery. Relay 108 is maintained energized under control of key 101 over this path.

As another result of the energization of relay 108, the energizing circuit of armature 126 is opened at armature 125 and its back contact, while at the front contact of this armature one point in the energizing circuit of keys 102 and 103 is completed.

At armature 124 and its back contact the circuits of the off-normal contacts O. N. are opened.

An armature 123 and its back contact the energizing circuit of relay 109 is opened, and this relay is de-energized. This operation has no effect on stepping magnet 112 at this time because of the fact that the circuits of armature 126 are made ineffective due to the energization of relay 108.

As a further effect of the energization of relay 108 there is a circuit completed which extends from positive battery through normally made contacts of dial 100, lever spring 120 and its working contact, armature 123 and its front contact, switch wiper 115 and its resting bank contact 9, conductor 134 and winding of relay 201 to negative battery on conductor 199. Relay 201 is energized over this path.

Due to the energization of relay 108, the relay 109 has been disconnected from the circuits of the dial device 100, and relay 201 has been connected thereto. The wipers 113 to 117, inclusive, will now rest on their respective ninth bank contact under control of the key 101 and relay 108.

In connection with the operation of dial device 101, it will be noted that each time the springs of the dial device are opened during the transmission of an impulse the energizing circuit of lamp signal 107 is opened. In this manner the lamp signal 107 is caused to blink in response to the operation of the dial 100. The lamp signal 107 thus serves as a telltale signal indicating to the dispatcher that the impulses are being transmitted.

The connector or final selector switch, comprising relays 201 to 205, inclusive, relays 228 and 229, magnets 206 to 208, wipers 301 to 303, inclusive, and their associated bank contacts, is of the latest Strowger type now commonly used in automatic telephony.

The wipers 301 to 303, inclusive, are attached to a common driving shaft which has an up and around movement. The driving shaft at first operated by vertical magnet 206 to contact levers 1 to 0 as desired, the 0 on the dial impulse sender having a value of ten impulses. Then, on the second digit dialed into this switch the wiper driving shaft is rotated to give the wipers a horizontal movement. The general construction of switches of this character is so well known that it is believed further details describing their operation are not necessary in this specification.

As a result of the energization of relay 201 in the manner previously described there is a circuit completed extending from positive battery on conductor 198 through armature 210 and its front contact and winding of relay 202 to negative battery. Relay 202, which is of the slow to release type, is energized over this path.

Relay 201 is the impulse relay and is arranged to be de-energized and energized in turn due to the operation of dial device 100 when the second and third digits are dialed.

Relay 202, being slow to release, maintains its armatures 212 and 213 attracted during the rapid operation of relay 201. A copper slug placed on the relay core causes a relay of the slow to release type to retain sufficient magnetizing power to prevent the retraction of its armatures for a slight interval of time after the energizing current is removed from the relay winding.

When the relay 201 is de-energized by the operation of the dial 100, during the receipt of the first digit, there is a circuit completed which extends from positive battery on conductor 198 through armature 210 and its back contact, armature 212 and its front contact, contacts 221 and 219 of the off-normal springs O. N., winding of slow release type relay 205, and winding of vertical magnet 206 to negative battery. Relay 205 and vertical magnet 206 are energized in series over this path.

The off-normal springs O. N. are operated on the first impulse from the dial device to open the connection between springs 219 and 221. However, the spring 221 makes contact with spring 225 before spring 221 breaks contact with spring 219 to provide a holding circuit which is effective to maintain slow to release relay 205 energized during the receipt of the first train of impulses. The holding circuit and the impulse circuit after the first impulse are changed to include armature 212 and its front contact, off-normal springs 221 and 225, armature 218 and front contact, winding of relay 205 and winding of vertical magnet 206, which is connected to negative battery.

Each time the vertical magnet 206 is energized, its ratchet device is positioned in such manner that the wiper shaft is raised one step in its vertical movement when the magnet is again de-energized.

Relay 203 is again energized in parallel with the circuit just described for the energization of relay 205 and vertical magnet 206. Relay 203 in turn causes the energization or relay 204 over a path extending from positive battery on conductor 198 through armature 214 and front contact and winding of relay 204 to negative battery on conductor 199. The purpose of relay 204 is to maintain the circuits of wipers 301 to 303, inclusive, open at armatures 215, 216 and 217 during the operation of the vertical magnet 206 and rotary magnet 207 to prevent interference with circuits connected to the bank contacts over which the wipers 301 to 303 might pass in their movement to the desired position.

In this instance, as 1 is the second digit of the number 210 dialed and the first digit received by the connector switch, the wipers 301 to 303, inclusive, are positioned on the first level of bank contacts. The switch is now ready for its rotary and final movement.

The relay 205 retracts its armatures during the interval between the impulses, and since the original energizing circuit of this relay is now open at the off-normal contacts O. N., this relay 205 is not energized by the succeeding operations of relay 201.

The dispatcher now dials the final digit, which in the present instance is 0, and which has a value of ten impulses. The relay 201 is de-energized and energized ten times in response to this dialing operation.

Upon each de-energization of relay 201 there is a circuit completed which extends from positive battery on conductor 198 through armature 210 and its back contact, armature 212 and its front contact, off-normal springs 221 and 225, which are now making contact, armature 218 and its back contact, and winding of rotary magnet 207 to negative battery on conductor 199. The rotary magnet when energized positions a pawl and ratchet device on the wiper shaft in such manner that the shaft is rotated one step in its step-by-step horizontal movement when the rotary magnet is again de-energized.

Relay 203 is again energized by the operation of relay 201. This relay in turn energizes relay 204, and since both of these relays are slow to release, the armatures 215 to 217, inclusive, are maintained attracted during the operation of the rotary magnet 207.

The complete three-digit number 810 having now been dialed, the final selection is completed. Relays 201 and 202 are the only relays maintained energized after the cessation of the impulses completing the last digit.

The energizing circuit of relay 203 is now open, and this relay retracts its armature 214 to in turn open the energizing circuit of relay 204. Relay 204 then releases its armatures to close through the selecting circuits of the wipers 301 to 303, inclusive.

The wiper 301 is resting on bank contact 324, wiper 302 is resting on bank contact 323, and wiper 303 is resting on bank contact 322 as a result of the operation of the switch magnets 206 and 207 in the manner above described.

At 209 an interrupter of the cam or commutator type is represented. This interrupter may be geared, for such speed as desired, to a motor operated from an alternating or direct current source.

There is now a circuit completed for flashing the lamp signal 305 in order that the dispatcher may check the accuracy of his selecting devices and be assured that the desired lamp unit is connected to the controlling keys 102 and 103. This flashing circuit may be traced over a path which extends from negative battery on conductor 199 through intermittently closed contacts at interrupter 209 between springs 226 and 227, through armature 231 and back contact, armature 211 and its front contact, armature 217 and its back contact, conductor 224, wiper 303 and its resting contact 322, and winding of resistance 310 to positive battery on conductor 198. The lamp signal 305 is shunted intermittently by the circuit just traced.

The lamp signal 305 now continues to flash as the interrupter 209 operates. The dispatcher visually checks the accuracy of his selection by means of this flashing signal. Since the number plate on the signal unit, as shown in Fig. 5, is sufficiently large, he is able to see it from his desk on the wall map and readily make this check.

Assuming now that the dispatcher issues an order by the telephone method for the operation of the actual power switching device 810 at a distant station to its closed position, an attendant at the distant station reports back that the device has been so operated, and the dispatcher now desires to light the red lamp 304 to indicate that the switch 810 is in the closed position.

To accomplish this result the key 102 is depressed momentarily and completes a circuit which extends from positive battery through armature 125 and its front contact, contacts of key 102, wiper 113 and resting bank contact 9, conductor 132, armature 216 and its back contact, conductor 223, wiper 302 and resting bank contact 323, winding of trip magnet 309 to negative battery on conductor 199. The armature 318 is attracted due to the energization of winding 309 and the latch is removed from the shutter type armature 314.

Armature 314 is now moved to make connection with its front contact 329. As a result, the energizing circuit of lamp signal 305 is opened and the lamp signal 304 is energized. Signal 304 will now remain energized to keep the dispatcher informed as to the operation which he has performed.

In order to again light the lamp signal 305, the dispatcher must depress key 103. A circuit will then be completed over a path which includes contacts of key 103, wiper 114 and bank contact 9, conductor 133, armature 215 and its back contact, conductor 222, wiper 301 and its resting contact 324, and winding 330 to negative battery on conductor 199. When winding 330 is energized the armature 314 is again attracted in such manner that if the energizing circuit of winding 309 is opened, as would be the case if the dispatcher released the key 102 after the previous operation, the armature 318 will now act to restore the latch on the armature 314.

In the above manner, the lamp signals may be changed at will by the operation of keys 102 and 103 after the selection has been made and verified by the dispatcher.

In order to restore all selecting apparatus to its normal position, the dispatcher simply returns key 101 to its normal position. As a result, the holding circuit of relay 108 is opened and relay 108 is de-energized. The energizing circuit of relay 201 is thus opened at armature 123 and its front contact, and relay 201 is de-energized.

The de-energization of relay 201 in turn opens the energizing circuit of relay 202, and after a short interval of time relay 202 retracts its armatures to complete a circuit which extends from positive battery on conductor 198, through armature 210 and its back contact, armature 212 and its back contact, contact and lever spring 220 of the off-normal springs O. N., and winding of the release magnet 208 to negative battery on conductor 199.

When the release magnet 208 is energized, the pawl and ratchet mechanism holding the wiper shaft and the wipers 301 to 303, inclusive, in position, is operated in such manner that the shaft is restored to its normal position out of contact and at the bottom of the bank levers. The off-normal springs O. N. are then operated to open the energizing circuit of the release magnet 208.

The circuit of wiper 303 was opened at armature 211 and its front contact, and wipers 301 and 302 have their circuits opened at the contacts of keys 102 and 103 when the wipers are restored to their normal position.

As another result of the de-energization of relay 108 there is a circuit completed which extends from positive battery through armature 125 and its back contact, armature 126 and its back contact, armature 127 and its back contact, bank contacts 2 to 17, inclusive, associated with wiper 116, wiper 116, armature 128 and its back contact, and winding of stepping magnet 112 to negative battery. The stepping magnet 112 is energized over this path, and each time it so operates the energizing circuit just traced is opened at armature spring 129. In this manner the stepping magnet 112 is caused to operate as an interrupter so long as wiper 116 rests on any of its bank contacts 2 to 17, inclusive.

When the wiper 116 rests on bank contact 1 of its switch bank, the energizing circuits just traced are opened and the switch movement stops. In this manner the wipers 113 to 117, inclusive, are brought to rest in their normal position on bank contact 1 of their associated switch banks.

It will be seen that the apparatus shown in Fig. 1 may be duplicated at another dispatcher's position and that the conductors 132 to 135, inclusive, may be connected to the switch banks of the first selector switch at the second position in such manner that the connector switch comprising relays 201 to 205, relays 228 and 229, stepping magnets 206 to 208 and their off-normal contacts and associated bank contacts may be selectable from another dispatcher's position. By this arrangement more than one dispatcher may operate the same signal devices.

When the relay 202 is energized the connector is in a busy condition. In case the wiper 117 came to rest on its bank contact 9 at a time when another selector switch has its wipers on the same test contact and has connection with the connector switch, it will be seen that the relay 202 will be energized, and therefore there is no circuit effective through the wiper 117 for the energization of relay 108.

The off-normal springs O. N. are operated when the wipers 113 to 117, inclusive, move off their normal resting point on bank contact 1 of their respective switch banks.

If the relay 108 is not energized when the rotary action of wipers 113 to 117, inclusive, is stopped due to a busy condition on the bank contact on which the wiper 117 rests, there is a circuit completed which extends from positive battery through armature 131 and its back contact, lever spring 136 and making off-normal contact, back contact and armature 124, lever spring 121, working contact on key 101 and filament of lamp signal 106 to negative battery.

The lamp signal 106 is energized over this path to indicate to the dispatcher that the connector switch with which he has tried to get connection is busy. In a system of this type a visual busy indication is required, since the dispatcher is not connected to the selecting circuits with telephone equipment which would inform him of the busy operation.

In order to illustrate that the selecting devices may be used to connect a common dispatcher's telephone equipment located at his desk to a plurality of outgoing telephone trunk lines, there is shown at the desk a key 105 and a block diagram A which represents the dispatcher's telephone equipment, while at the wall map suitable terminal facilities are shown for an outgoing telephone circuit, represented by the block diagram A'.

The dial dispatcher may use the dial 100 for selecting any desired outgoing or incoming telephone line, and after having completed the selection he may connect to such outgoing or incoming telephone circuit by means of a key 105.

Key 104 may be used to connect a testing equipment represented by the block B to an artificial line circuit such as that represented by the block B'. It is possible to construct by means of suitable variable resistance elements an artificial line that closely corresponds to certain characteristics of a power-transmission circuit. The purpose of such a line is to make a series of short circuits for timing relay tests in order to determine the location of trouble on the actual transmission line. Block B' represents an artificial line of this character.

At the dispatcher's desk the block B represents a testing circuit and suitable apparatus to enable a dispatcher to make tests on the artificial line which has been set up to agree with certain power-transmission line characteristics. Key 104 may be used to make the proper testing circuit connection after the dispatcher has selected the desired artificial line such as that represented at B'.

These points are brought out in order to illustrate how this invention may be used to provide a selectable equipment for telephone lines and artificial test line devices in connection with the control of lamp signals on an illuminated, straight-line diagram of a power system.

Referring now to Fig. 3, the lamp-signal control unit 801 is of the latching relay type. The circuits of this type of units are shown to illustrate the manner in which a unit may be selected and caused to flash and then released and other units selected without disturbing the flashing indication of the unit released. It is believed to be obvious that all the signals may be of the type of unit No. 801 if desired. The distinction between units 801 and units 810 lies in this feature of permitting the dispatcher to select and start flashing any number of units such as 801 by making successive selections. In this manner he may set up any proposed operation on the map and study it without destroying the original distinctive indication, and he may then, by reselecting, change the flashing indication back to its original indication or to a changed indication to show that the proposed operation has been completed. The armature 316 may be attracted by the magnet 311, and when so attracted the latching armature 315 will operate to hold the armature 316 in connection with its upper contact point. The circuit is then completed to light the lamp signal 306.

The magnets 311 and 312 are energized from the dispatcher's desk in a manner similar to that described in connection with the drop device 810 controlling lamp signals 304 and 305. When the trip magnet 312 is energized the armature 315 is attracted in such manner that the armature 316 is released to the position shown in Fig. 3. The energizing circuit of the lamp 307 is then completed by armature 316 and its back contact.

When wipers 301 and 302 rest on bank contacts 319 and 320, respectively, the latching relay device 801 is placed under control of keys 102 and 103.

When wiper 303 rests on bank contact 321 the flashing circuit is completed for either lamp 306 or 307, depending upon the position of the armature 316. The lamp signal is shunted intermittently in the same manner as was described in connection with signals 304 and 305. The resistance 317 in the circuit of armature 316 makes the flashing feature possible.

In order to illustrate how a number of flashing signals may be set up by the dispatcher and maintained to give a picture of a proposed change in the position of a number of units so that the dispatcher may study the proposed change and the probable results thereof, the flashing circuit of the signal device 801 will be described in detail.

Assuming that the dispatcher has dialed the number 801 and that as a result the wiper 301 is resting on bank contact 319, wiper 302 on bank contact 320, and wiper 303 on bank contact 321, there is now a circuit completed extending from negative battery through the contacts of the interrupter device 209, armature 231 and back contact, armature 211 and front contact, armature 217 and back contact, conductor 224, wiper 303 and its resting bank contact 321, front contact 335 and its resting spring 334, and winding of relay 340 to positive battery on conductor 198. The relay 340 is energized over the path just traced. As a result there is a circuit completed extending from negative battery on conductor 199, through armature 331 and back contact, and armature 332, armature 333 and front contact 334 (which is made before the contact 335 breaks from contact 334), and winding of relay 340 to positive battery on conductor 198.

A holding circuit is provided for relay 340 over the path just traced. There is also a circuit completed which extends from negative battery on conductor 199 through winding of resistance 233, intermittently closing contacts 226 and 227 of the interrupter 209, armature 231 and back contact, conductor 197, armature 341 and front contact, and winding of resistance 317 to positive battery on conductor 198. The lamp signal 307 is intermittently shunted over the path just traced. The signal 307 will continue to flash so long as relay 340 remains energized.

The dispatcher may release his selecting devices, comprising the selector illustrated in Fig. 1 and connector illustrated in Figs. 2 and 3, and restore this equipment to normal. However, the lamp signal 307 will continue to flash as an indication of a proposed switching operation.

The dispatcher may now select another signal device similar to 801 and set up still another flashing signal to indicate another proposed switching operation. It is believed to be unnecessary to show such other signal device, as it would be merely a duplication of 801 and its attendant flashing equipment.

We will now assume that the dispatcher desires to reset signal device 801 to its normal condition. He will again dial the number 801 on the dial, and as a result the wipers 301 to 303, inclusive, will be brought to rest on their respective bank contacts 319 to 321, inclusive. By the operation of the key 103, the dispatcher may complete a circuit which extends from positive battery at armature 125 and front contact through make contact of key 103, wiper 114 and its resting bank contact 9, conductor 133, armature 215 and back contact, conductor 222, wiper 301 and its resting bank contact 319 and winding of trip magnet 312 to negative battery on conductor 199. When the trip magnet 312 is energized over the path just traced the holding circuit of relay 340 is opened at armature 332 and its back contact, and relay 340 is thus de-energized.

In parallel with the circuit just traced, there is a circuit completed to energize relay 229. Relay 229 has two windings, one of which is connected to conductor 222, while the other is connected to conductor 223, the opposed ends of both of these windings being connected to negative battery on conductor 199. Relay 229 is energized each time a circuit is completed over either of the conductors 222 or 223 due to the above mentioned connection.

When relay 229 is energized there is a circuit completed which extends from positive battery on conductor 198 through armature 230 and its front contact and winding of relay 228 to negative battery on conductor 199. Relay 228 is energized over this path.

As a result there is a circuit completed extending from positive battery on conductor 198 through armature 210 and front contact, armature 232 and front contact, and winding of relay 228 to negative battery. With relay 228 energized in the above manner, the circuit of armatures 211 and 217, conductor 224 and wiper 303, over which the relay 340 was energized to start the flashing operation of signal 307, is opened. Relay 340 will not again be energized while the connector switch is positioned with its wipers resting on the circuits of the signal device 801.

It will be seen that in case the dispatcher operated key 102, instead of key 103, the magnet 311 of signal device 801 would be energized to open the holding circuit of the relay 340 at armature 331, and at the same time armature 316 would be attracted to open the energized circuit of the lamp signal 307 and close the energizing circuit of lamp signal 306. Thus, when the dispatcher completes the selecting operation to connect a signal device such as 801 to the operating circuits of keys 102 and 103, the lamp signal which is connected in circuit with any of the armatures, such as 316, is caused to flash automatically. When the dispatcher operates either of the magnets, such as 311 or 312, of the signal device, the flashing signal is changed to a steady signal.

It is thought that the above description, when taken in connection with the accompanying drawings, will make the construction and operation of this system clear to one skilled in this art.

Having thus described my invention, what I claim as new and desire to secure by Letters Patent of the United States is:

1. A dispatcher's indicating system or the like having a plurality of signaling means, each adapted to display a plurality of unlike signals indicative of a plurality of conditions under the supervision of the dispatcher, control means for selecting one of said signaling means, means associated with said signaling means for automatically displaying a tentative signal upon the selected signaling means, and locking means automatically operative upon selection of said signal means for causing said selected signaling means to continue to display said tentative signal after being released by said control means, said control means being operative to select another signalling means and release it and then to reselect the signaling means displaying said tentative signal without changing the tentative signal displayed thereby.

2. In a dispatcher's indicating system or the like, a plurality of signal devices indicative of certain conditions, selective control means operatively associated with said signal devices for selecting any one of said devices, and means for selectively changing the indication displayed by said selected signal device, said signal devices each having means continuously displaying an indication until the device is selected and the indication changed, and said selective control means automatically imposing a distinctive indication upon the indication displayed by a signal device upon the selection thereof and before changing the distinctive characteristic of the original indication.

3. In a dispatcher's indicating system or the like, a plurality of signal devices indicative of certain conditions, selective control means operatively associated with said signal devices for selecting any one of said devices, and means for selectively changing the indication displayed by said selected signal device, said signal devices each having means continuously displaying an indication until the device is selected and the indication changed, and said selective control means having means causing the selected signal device to thereafter intermittently display the indication displayed thereby when the signal device is selected.

In witness whereof, I hereunto subscribe my name this 6th day of March, A. D., 1928.

THOMAS U. WHITE.